Patented Oct. 9, 1934

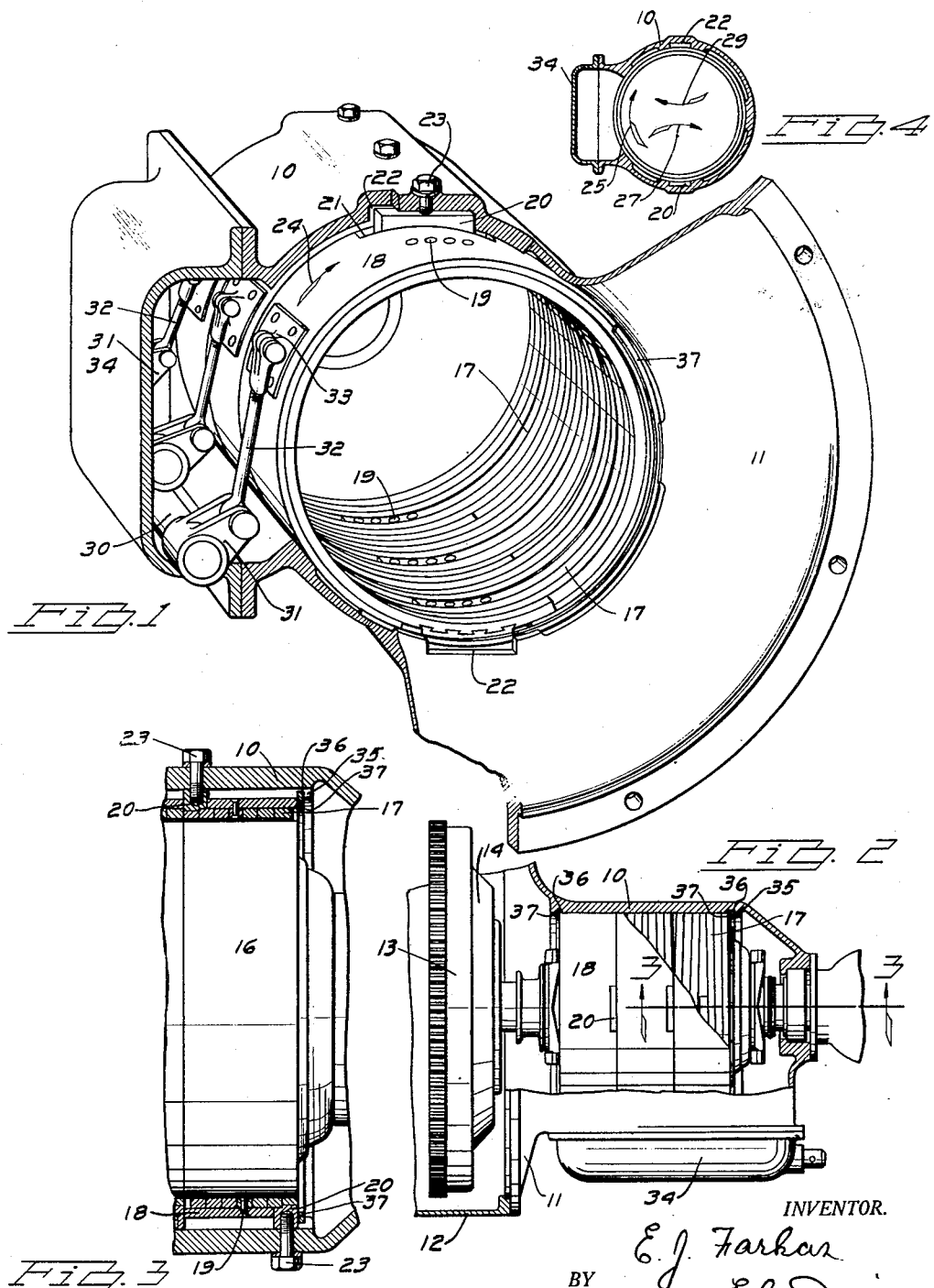

1,975,835

UNITED STATES PATENT OFFICE

1,975,835

TRANSMISSION OPERATING MECHANISM

Eugene J. Farkas, Detroit, Mich., assignor to Ford Motor Company, Dearborn, Mich., a corporation of Delaware Application February 10, 1931, Serial No. 514,870

18 Claims. (Cl. 188—77)

The object of my invention is to provide a transmission operating mechanism especially suitable for operating planetary or epicyclic transmission gearings wherein a plurality of brake drums are to be selectively held from rotation to effect the various speed reduction ratios of the transmission. There are many advantages which arise only in such transmissions, some of which are, quietness of operation; absence of gear teeth clashing when changing speeds; distribution of the tooth strain over three gears spaced around the main driving shaft axis so as to allow the use of smaller and quieter gear teeth and also eliminate or neutralize the bearing loads caused by the pressure angle of the gear teeth; and the long life and durability resulting from such construction. There are, however, certain disadvantages associated with this type of transmission, namely, the excessive pressure required to stop the brake drums from rotation; the transverse bending strains induced in the driving shaft by anchoring the brake bands on only one side of the brake drums; and the excessive wear on the brake bands due to the friction absorbed in changing from one speed ratio to another. It is the purpose of this invention to provide an operating mechanism whereby the above mentioned and other objections will be overcome and which will incorporate all of the advantageous features of the planetary type transmission.

I am able to accomplish these desirable results by providing energized or self locking brake bands so that only a slight pressure is required to engage these bands thereby positively holding the respective brake drums from rotation. In order to avoid the jar which would normally result with such bands, due to the almost instantaneous change in gear ratio, I provide an engine clutch which is thrown out of engagement just prior to the engagement of each of these bands. After the band is locked in its drum, the clutch is then engaged to effect the speed change whereby the friction will be absorbed by the main engine clutch. For this reason I am enabled to use locking bands composed entirely of metal to thereby insure almost indefinite life and require very infrequent or no adjustment.

A most important feature in connection with this structure is the means whereby I eliminate the transverse bending strains which are inherent in most planetary transmission. In the ordinary planetary transmission, a band is usually disposed around each transmission brake drum which, when it is desired to stop the drum, is contracted or clamped together, one end of the band being anchored to the transmission housing. In such structures bending stresses equivalent to the torque reaction of the transmission drum at a distance equivalent to the radial spacing of the anchor is induced in the transmission band tending to rotate it around the anchor point. These stresses are transmitted from the band to the drum and then through the various bearings in the transmission to the main driving shaft, so that most of the bearings are under an extremely heavy load when the gearing is in operation.

In my improved device I provide a pair of bands for each brake drum, which bands are anchored on diametrically opposite sides of the transmission case. These bands are simultaneously actuated to grip their respective brake drums. The transverse forces inducing each of these bands to follow an arcuate path around its respective point of anchor are impressed on the brake drum from opposite sides so that the stresses cancel out thereby eliminating the load which would otherwise by resisted only by the transmission main shaft.

It is believed to be new in the transmission art to provide a pair of fully energized locking bands so anchored that the reaction from one band neutralizes the reaction from the other.

Still a further object of my invention is to provide a simple but extremely efficient means whereby these two locking bands are simultaneously operated, which means are believed to be not only new but to have distinct commercial advantages, due to the simplicity, reliability and low initial cost of the device. Formerly, cams, levers, toggle joints, and numerous other mechanical movements were utilized to operate transmission bands. If such devices were duplicated, one on each side of the transmission to operate two bands at the same time, the numerous shafts, links, etc. would become excessive, so that the device is not only very costly but also its reliability is materially reduced. In my improved device I anchor one end of the bands in the transmission case and the other ends in a ring which is rotatably mounted around the bands. A tangential force on any portion of the ring is converted into a rotary force which locks the bands simultaneously to the drum. Thus, my single ring is sufficient to accomplish in a more reliable manner all the functions of the costly and intricate band operating mechanisms heretofore employed.

A further function of this ring is that when the bands are disengaged they are accurately spaced from the adjacent drum with a definite clearance to thereby eliminate drag on the transmission drums. I am thus able to reduce this clearance to a minimum thereby utilizing practically the full operating movement for the locking action.

With these and other objects in view my invention consists in the arrangement, construction and combination of the various parts of my improved device, as described in the specification, claimed in my claims, and illustrated in the accompanying drawing, in which:

Figure 1 shows a perspective view of my improved operating mechanism, the transmission housing being broken away and the brake drums and gearing ordinarily disposed therein being removed, to better illustrate the construction and operation.

Figure 2 shows a plan view of a transmission having my improved operating mechanism installed therein, parts being broken away to better illustrate the construction.

Figure 3 shows a sectional view, taken on the lines 3—3 of Figure 2, and

Figure 4 shows a diagrammatic view of the torque stresses in the transmission, illustrating the neutralizing action of my two diametrically opposite locking band anchors.

Referring to the accompanying drawing, I have used the reference numeral 10 to indicate a transmission housing of cylindrical shape having a bell flange 11 formed integrally with its forward end by which it is secured to a flywheel housing 12 of an engine. A flywheel 13 is rotatably mounted in the housing 12 and is secured to the rear end of the engine crank shaft so that a disc clutch 14, housed within this flywheel, may be operated in the ordinary manner.

A planetary transmission is mounted between the center of the flywheel 13 and the rear of the housing 10. This transmission is provided with three brake drums 16 which are adapted to be selectively held from rotation to effect the various speed ratios of the transmission. The particular gearing used in the transmission will not be described, as it forms no part of this invention, and because any ordinary type of planetary transmission gearing may be operated with my improved mechanism.

Around each of the brake drums 16, I have provided a pair of helical steel bands 17 of 2 or 3 turns each. The number of turns or wraps around the drum will depend upon the coefficient of friction between the drum and the bands and also on the maximum operating or pedal pressure allowable to operate the device. I have found that a spring steel band having about two and one-half turns operating on a hardened steel drum in an oil bath will give excellent results.

It is desirable in most installations to so proportion the bands that they will not quite lock themselves to the drum by their energizing action so that when the operating force is released the bands will unwrap and leave the drum free. This action will result with the above type of bands. The bands are preferably made from the spring steel having their interior diameters ground to a diameter a fraction of an inch greater than the diameter of the brake drum, thus, in their normal positions the bands have no tendency to grip the brake drum. With the operating device about to be described the bands may or may not be manually released; however, when a pre-selector or automatic band operating device is used it is usually desirable to utilize the tension in the band to urge it to its inoperative position independently of any auxiliary mechanism.

Two of the bands are mounted side by side within an operating ring 18, which ring is rotatably mounted and accurately piloted within the transmission case in alignment with the transmission drums. The bands 17 must be slightly compressed to enter the bore in the rings 18 so that a definite clearance between the bands and the brake drum is provided in the disengaged or inoperative position. This means for accurately centering the bands around the drums insures that there will be no tendency for the bands to drag on the drums, thereby causing friction when the transmission is operating in direct drive.

The adjacent ends of the two bands 17 in each ring 18 are secured by rivets 19 at diametrically opposite points to the ring. The free ends of these bands extend oppositely to the outer edges of the rings where a lug 20 is dovetailed to each end so that these ends of the bands may be anchored to the transmission case. A slot 21 is provided in each side of the ring 18, one at the top and one at the bottom, of considerably greater length than the lugs 20. The lugs project through these slots but it will be seen that the ring 18 is permitted a limited rotary movement even though the lugs are held stationary.

A pair of diametrically opposed longitudinal grooves 22 are machined in the transmission case 10 parallel to the axis of the transmission, one at the top and one at the bottom, in which the lugs 22 are assembled. As will be seen these lugs project through the slots 21 a sufficient distance to fit in the grooves 22 thereby anchoring one end of each band in the transmission case. Cap screws 23 are screwed through the transmission case and are threaded into the lugs to thereby positively draw the lugs into the grooves. The anchored end of each of these bands is thus drawn a slight distance away from the brake drum and is held in this position at all times.

It will be seen that when the ring 18 is oscillated the riveted ends of both bands therein will be wrapped around the adjacent drum thereby simultaneously gripping the brake drum. In the present disclosure the outside ends of the bands are anchored and the adjacent ends are fastened to the ring 18 so that one band must be right hand wound and the other left hand. However, bands of the same spiral may be used but it is necessary in this case to reverse the anchorage end of one of the bands.

Referring to Figure 1, when the ring 18 is rotated in the direction shown by the arrow 24, both bands are compressed to thereby lock both bands simultaneously around the adjacent brake drum. Due to the plurality of turns of each of these bands an energizing action is obtained which absorbs a high torque on the drum with only a very light torque on the ring required to start the wrapping action. The anchored ends of the bands or lugs 20 transmit the brake torque directly to the transmission case without in any way interfering with the operating rings. It will be apparent that the non-energized ends of both bands are anchored to the operating ring to thereby secure easy operation of the rings, and that there is no objection to so anchoring the ends as such transmission drums rotate in only one direction and therefore the energized or non-energized characteristics of the respective ends of the bands remain constant. However, means for anchoring the bands to either the transmission housing or the operating ring is not of primary importance as this device may readily be adapted to operate with brake drums which must be stopped from rotation in either direction.

The primary feature of this invention is that a tangential movement applied to a rotatably operating ring or member is thereby converted into a rotary movement so that it may directly actuate the ends of one or more brake bands to tighten same against the drum.

Still further, I do not wish to limit the operation of this device to that of clamping the bands into engagement. If desired the bands may be formed with an inherent tension sufficient to lock them into engagement with the drum independently of any auxiliary force, and in such case my operating ring will function only to hold the bands out of engagement.

Referring to Figure 4, it will be seen that rotation of a brake drum in the direction shown by the arrow 25 may be resisted by rotation of its operating ring in the same direction, which tends to drag both bands around with the drum. One of the bands being anchored at the bottom tends to rotate around this anchor in the direction shown by the arrow 27, while the other band being anchored at the top tends to rotate around its anchor in the direction shown by the arrow 29. It will be seen that these two forces are equal and are applied in opposite directions on opposite sides of the drums so that they cancel out, thereby exerting no bending force on the transmission supporting shaft or bearings. This feature is highly important for the successful operation of the device as it materially prolongs the life of the transmission bearings to thereby better maintain the alignment of the gears when the transmission gearing is in operation.

If a single band were employed instead of my two oppositely anchored bands, not only would a large bending strain be induced in the main shaft of the transmission but also, due to the small clearance which I maintain between the outside diameter of the bands and the bore in the rings 18 when the bands are engaged, the free operation of the operating ring would be hindered. The main shaft of the transmission would without doubt flex sufficiently that the brake drum and band secured therearound would bear against one side of the operating ring thereby forcing it against the transmission housing with sufficient pressure to at least prevent the easy operation of the ring 18 if not lock it against rotation.

Inasmuch as in most transmissions the disengagement of the band depends upon a return spring pressure it is essential that the operating ring be free to return by either an auxiliary spring or by the inherent tension in the bands. Therefore, in order to cancel out the transverse stresses inherent when a single band is used and thus insure free operation of the operating ring, I employ two bands anchored on opposite sides of the transmission and arranged to simultaneously operate these bands.

The neutralization of the bending stresses may be better understood by referring to Figure 4 wherein if only one band were used, for example, that band which is anchored at 20, and the brake then applied, the torque of the engine which rotates the drum around its axis will then attempt to rotate the drum as a whole around the anchor 20. This action is impressed in the direction of the arrow 27. It will be readily seen that if the axis of the drum were free to revolve around an axis coinciding with the pivot 20 and only one band used, that the band could be clamped to the drum and the whole unit revolved around this new axis without causing any friction between the drum and the band and without absorbing any engine torque. To absorb torque not only must the brake anchor be held from rotating around the axis of the drum but it is equally important that the axis of the drum be prevented from rotating around the brake anchor. Restraining the drum from rotating around the anchor 20, however, does not relieve the stress upon the supporting bearings and, consequently, the drum still tends to revolve in the direction of the arrow 27. The bearings even though resisting the rotation of the drum around the anchor cannot prevent deflection in the transmission shaft nor prevent wear on the transmission bearings due to this force.

In the applicant's device the detrimental effects of the above described construction are eliminated for the reason that a second band is anchored at 22 which produces an equivalent stress on the drum axis tending to rotate the unit as a whole around the anchor 22 in the direction of arrow 29. The anchors 20 and 22 being diametrically opposite these stresses are exactly neutralized so that when both brake bands are applied there is no tendency for the drum shaft to bend such as occurs in all other braking devices known to the applicant.

Means are provided for manually rotating each of the operating rings through a limited arcuate movement to thereby engage the respective bands. This device consists of a shaft 30 having an arm 31 extending therefrom to which a rod 32 is pivotally connected. The upper end of the rod 32 is pivotally connected to an eye 33 which is riveted to the adjacent ring so that rotation of the shaft 30 will rotate the operating ring. A similar device is employed for each ring operated. A cover plate 34 is secured over one side of the transmission housing in order to enclose this mechanism and provide an oil-tight casing for the transmission gearing to operate in.

Although only an elementary lever motion is shown to operate my rings, I do not wish to limit the operation thereof to such mechanisms as the means for operating the rings may be any one of numerous actuating devices. If desired, the clutch pedal of the vehicle may be connected through a suitable selector mechanism to actuate any desired band. The return spring for the engine clutch pedal is amply strong to actuate these rings so that suitable mechanism for selecting the desired band for this spring to operate against can readily be provided if a selective transmission is desired. In a succeeding application a pre-selecting mechanism utilizing my improved transmission band and operating device will be described.

To assemble my improved operating mechanism three operating rings, each having a pair of bands secured therein, are successively pushed into the transmission housing. The first ring butts up against a shoulder machined in the housing to locate the rings in the correct position. To retain the rings in place a retaining ring 37 is sprung into a groove 36 which is machined in the housing thereby preventing the withdrawal of the rings. It will be noted that the lugs 20 simply slide along in the grooves 22 to their proper position and that when the three bands are installed the cap screws 23 may be screwed home to securely anchor the lugs in the transmission housing. Inasmuch as the bands in their free position tend to unwrap, it will be seen that these bands closely hug the inside diameter of the rings thereby allowing the transmission unit to be inserted bodily into position inside of the operating rings.

Among the many advantages arising from the use of my improved device, it may be well to mention that I have provided a simple means for simultaneously actuating one or more locking bands to grip the adjacent brake drum. This actuating means consists of a simple ring rotatably mounted in the transmission housing which dispenses with all the intricate cams, toggles, cross shafts and the like which are ordinarily necessary. With my improved device I am enabled to maintain a positive but still very small clearance between the bands and the brake drums so that only a very small movement of the band is required to fully engage the device. Due to this small movement a high leverage ratio may be provided to thereby reduce to a negligible amount the force required to operate the bands. Thus a very light spring can readily accomplish with this device the work that formerly required a heavy foot pedal pressure.

Still a further advantage results in that my improved device may be easily assembled there being only a relatively small number of parts required. Still further, due to the simplicity of this operating mechanism and the precision with which it functions, the device may be commercialized on inexpensive cars to thereby improve the performance with little or no increase in manufacturing cost.

Some changes may be made in the arrangement, construction and combination of the various parts of my improved device, without departing from the spirit of my invention, and it is my intention to cover by my claims such changes as may reasonably be included within the scope thereof.

I claim as my invention:

1. In a device for operatively holding a transmission brake drum from rotation, a brake band adapted to be self energized mounted in position to coact with said drum, the one end of said band being anchored against rotation, and an operating member rotatably mounted concentric with said drum, the other end of said band being fixed to said operating member, whereby oscillation of the operating member will engage and disengage the band with the drum.

2. In a device for operatively holding a transmission brake drum from rotation, a brake band wrapped around the outside of said drum, one end of said band being anchored against rotation, and an operating member rotatably mounted concentric with said drum, the other end of said band being fixed to said operating member, whereby oscillation of the operating member will engage and disengage the brake band with the drum.

3. In a device for operatively holding a brake drum from rotation, a brake band disposed around said drum, and a band operating ring disposed around said band, said ring being concentric with said drum, and means for expanding said band into engagement with said ring whereby the band when disengaged will be piloted in the ring to secure a uniform clearance between the band and the drum.

4. In a device for operatively holding a brake drum from rotation, a brake band wrapped around said drum having one end anchored against rotation, and an operating ring rotatably mounted around said band, the operatively applied end of the band being anchored in said ring, whereby rotation of the ring in one direction engages said band and drum and rotation of said ring in the opposite direction engages said band and ring for the purpose described.

5. In a device for operatively holding a brake drum from rotation, a pair of brake bands in position to coact with said drum, having one end of each band anchored against rotation at diametrically opposed points, and an operating member rotatably mounted concentric with said drum and operatively connected to the other ends of both bands in such manner that oscillation of the operating member will engage and disengage both bands simultaneously.

6. In a device for operatively holding a brake drum from rotation, a pair of brake bands wrapped around said drum, having one end of each band anchored against rotation at diametrically opposed points, and an operating ring rotatably mounted around said bands concentric with said drum and operatively connected to the other ends of the bands in such manner that oscillation of the operating ring will engage and disengage both ends simultaneously.

7. In a device for operatively holding a brake drum from rotation, a brake band wrapped around said drum, and a circumferentially slotted operating ring around said band rotatably mounted in alignment with said drum, one end of said band being anchored to said ring and the other end projecting through said slot and exteriorly anchored, whereby a limited oscillation of said ring is permitted to engage and disengage the band.

8. In a transmission having a drum therein adapted to be held from rotation to effect one of the various speeds thereof, a housing, a pair of self-energized brake bands wrapped around said drum having their anchored ends fixed at diametrically opposed points to the transmission housing, and an operating ring rotatably mounted in said housing concentric with said drum, the other ends of said bands being operatively connected to said ring whereby oscillation of the ring will engage and disengage said bands simultaneously.

9. In a transmission having a brake drum therein adapted to be held from rotation to effect one of the speeds thereof, a housing, a pair of brake bands wrapped around said drum having their anchored ends held against rotation at diametrically opposed points in the transmission housing, and an operating ring rotatably mounted in said housing concentric with said drum, the applied ends of said bands being riveted to said ring whereby oscillation of the ring will engage and disengage said bands simultaneously.

10. In a transmission having a brake drum therein adapted to be held from rotation to effect one of the speeds thereof, a brake band wrapped around said drum, a circumferentially slotted operating ring rotatably mounted in the transmission housing in alignment with said drum and extending around said band, one end of the band being secured to the ring and the other end projecting through said slot where it is anchored in the transmission housing whereby a limited oscillation of said ring is permitted to engage and disengage the band, and means for operatively applying a tangential force to said ring to operate same.

11. In a transmission having a brake drum therein adapted to be held from rotation to effect one of the speeds thereof, a pair of brake bands wrapped around said drum, a ring having a pair of diametrically opposed circumferential slots therein rotatably mounted in the transmission housing in alignment with said drum and extending around said bands, one end of both bands being riveted to said ring and the other ends projecting through the respective slots in the ring where they are anchored in the transmission housing, said slots permitting a limited oscillation of the ring to engage and disengage both bands simultaneously, and means for operatively applying a tangential force to said ring to operate same.

12. In a device for operatively holding a friction drum from rotation, a pair of friction members in position to coact with said drum, one end of each of the members being anchored against rotation at diametrically opposed points around the drum, and means for simultaneously applying the other ends of said members to said drum whereby the radial stresses induced upon the axis of said drum by reason of said friction member and drum tending to pivot around each of the respective anchors will be neutralized when the friction members are applied to the drum.

13. In a device for operatively holding a brake drum from rotation, a pair of bands each in position to coact with said drum, one end of each of the bands being anchored against rotation at diametrically opposed points around the drum, and means for simultaneously applying the other ends of said bands into engagement with said drum, whereby the radial stresses induced upon the axis of said drum by reason of said friction member and drum tending to pivot around each of the respective anchors will be neutralized.

14. In a device for operatively holding a brake drum from rotation, a pair of brake bands each having one complete wrap around the brake drums, one end of each of the bands being anchored against rotation at diametrically opposed points around the drum, and means for simultaneously applying the other ends of the bands into engagement with said drum, whereby the radial stresses induced upon the axis of said drum by reason of said friction member and drum tending to pivot around the respective brake anchors will be neutralized.

15. In a device for operatively holding a brake drum from rotation, a pair of friction members disposed in position to coact with said drum, one end of each of the members being anchored against rotation at diametrically opposed points around the drum and said members extending in the same direction around said drum from their anchored ends, and means for simultaneously engaging the other ends of said bands with said drum, whereby the radial stresses induced upon the axis of said drum by reason of said friction member and drum tending to pivot around each of the respective anchors will be neutralized.

16. A device for operatively holding a brake drum from rotation comprising, a friction member mounted so as to operatively engage said drum, one end of said member being anchored against rotation with said drum and the other end of said member being arranged to move into engagement with the drum, and an operating member rotatably mounted to oscillate on the axis of said drum, said engaging end of the friction member being actuated by said operating member into engagement with the drum when the operating member is rotated in one direction.

17. A device, as claimed in claim 16, wherein said friction member comprises a band which is adapted to wrap itself into engagement with the periphery of the brake drum.

18. A device, as claimed in claim 16, wherein said friction braking member comprises a band disposed around said brake drum, and wherein said operating member comprises a ring disposed around said band.

EUGENE J. FARKAS.